March 20, 1956     M. W. PHELPS     2,739,039
TREATMENT OF WASTE AMMONIUM SULFITE PULPING LIQUORS
Filed Aug. 24, 1951
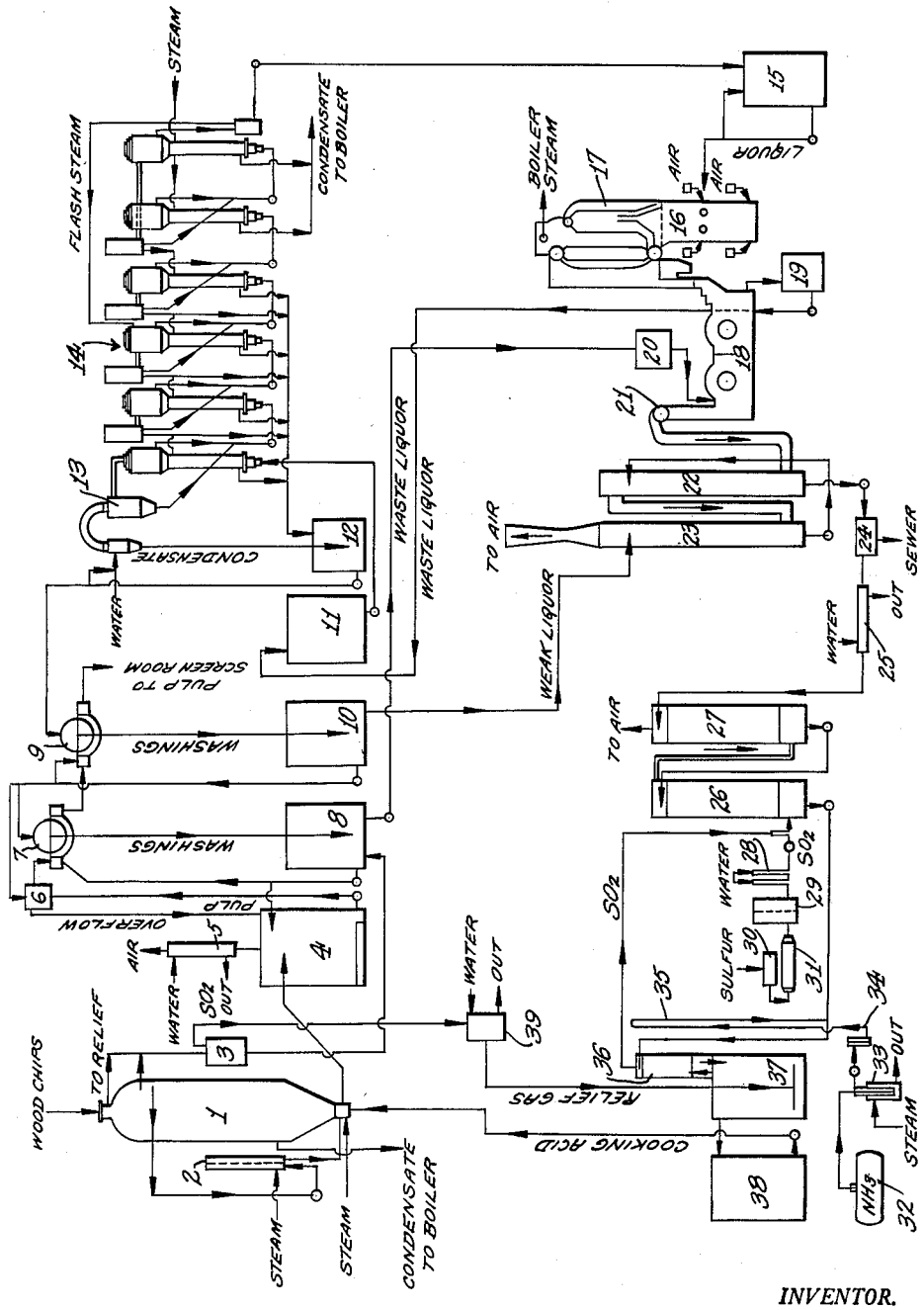
INVENTOR.
MAURICE W. PHELPS
BY Robert B Clark
ATTORNEY

United States Patent Office 2,739,039
Patented Mar. 20, 1956

2,739,039

TREATMENT OF WASTE AMMONIUM SULFITE PULPING LIQUORS

Maurice W. Phelps, Bound Brook, N. J., assignor to Allied Chemical & Dye Corporation, New York, N. Y., a corporation of New York Application August 24, 1951, Serial No. 243,507

5 Claims. (Cl. 23—129)

This application is a continuation-in-part of my application Serial No. 650,092, filed February 25, 1946, now abandoned.

This invention relates to a process for the treatment of ammonium sulfite waste liquors produced in the pulping of wood with ammonium sulfite.

Aqueous ammonium sulfite solutions have been employed for pulping wood with considerable success. However in pulping wood in this manner an ammonium sulfite waste liquor is produced containing large amounts of ammonium ligno-sulfonate. This liquor has an extremely high biochemical oxygen demand and hence its disposal has presented considerable difficulty since it cannot be dumped into streams without polluting the water to an objectionable extent.

It has been proposed to recover ammonia from such waste liquors by alkalizing the liquor with lime or caustic soda and then distilling to evolve the ammonia. The residual liquors resulting from these treatments contain calcium or sodium ligno-sulfonates and, therefore, also have high biochemical oxygen demands. It has been suggested that waste liquors containing sodium or calcium ligno-sulfonates might be burned in a combustion furnace; actual practice, however, has shown that in burning such liquors considerable difficulties are encountered among which are scaling of the heat exchangers and evaporators employed in concentrating the liquors to make them suitable for combustion, and production of residual ash in the furnaces from which useful chemicals may be recovered only at considerable cost. It will be seen, therefore, that none of the above methods proposed for disposal of ammonium sulfite waste liquors, offers the economical, non-polluting disposal which the art has been seeking.

It is known that kraft process waste pulping liquors can be concentrated and burned at high temperatures with recovery of a smelt of $Na_2CO_3$ and $Na_2S$ reconvertible to NaOH—$Na_2S$ pulping liquor. A reducing atmosphere (carbon monoxide) must be maintained in this operation to assure formation of $Na_2S$ rather than $Na_2SO_4$ from the sodium ligno-sulfonate of the waste liquors.

Similar operations have been proposed for treatment of sodium sulfite waste pulping liquors. Again a reducing atmosphere is employed whereby $Na_2CO_3$ and $Na_2S$ are obtained from the sodium ligno-sulfonate. The sulfide sulfur is convertible back to sulfite by acidification to form $H_2S$ followed by complete burning of $H_2S$ to $SO_2$.

Combustion of magnesium sulfite waste liquors has likewise been proposed, involving spraying waste magnesium sulfite pulping liquors downward into a combustion zone maintained at 2100–2300° F. and employing a reducing atmosphere to assure production of magnesium oxide and avoid magnesium sulfate.

Concentration and combustion of ammonium sulfite waste pulping liquors could not be expected to be analogous to the above combustion processes. In the first place under reducing conditions and high temperatures such as employed in the above discussed combustions the sulfur of ammonium ligno-sulfonate would be liberated as $H_2S$ and colloidal sulfur. (At high temperatures hydrogen sulfide readily decomposes to form colloidal sulfur.) $H_2S$ is extremely poisonous, and colloidal sulfur catalyzes sulfite decomposition. Therefore both these products are very objectionable in a sulfite cooking liquor.

Formation of $H_2S$ and colloidal sulfur during ammonium ligno-sulfonate combustion might be avoided by maintenance of an oxidizing atmosphere throughout the hot zone, using combustion temperatures adequate to oxidize all sulfur to sulfur dioxide. As recognized in the art, an oxidizing atmosphere is conducive to formation of sulfates from ligno-sulfonates. Moreover, ammonia is known to be oxidizable at waste pulping liquor combustion temperatures such as 1500° F. and above, forming nitrogen, water and oxides of nitrogen. Nitrogen oxides in turn are known to catalytically oxidize sulfur dioxide to sulfate in presence of steam as in the lead chamber sulfuric acid process. At the very high temperatures employed in prior art combustion of waste pulping liquors, ammonia would be completely oxidized, and to the extent it was oxidized to nitrogen oxides it would magnify by catalytic action the oxidation of sulfur dioxide to undesired sulfate.

Finally ammonia is known to be readily dissociable to nitrogen and hydrogen at elevated temperatures, especially in presence of catalytic surfaces such as metallic surfaces, e. g. iron, nickel, zinc, etc. This ammonia dissociation is nearly complete at temperatures of about 900–1100° F. Carbon is catalytic of ammonia decomposition at temperatures above about 1400° F., bringing about formation of nitrogen, hydrogen and hydrogen cyanide.

From the foregoing, it is evident that combustion of ammonia base waste pulping liquors presents difficulties of $H_2S$ and colloidal sulfur formation and sulfate formation, and that under conditions recommended heretofore for disposal of waste pulping liquors by combustion, little ammonia which might be obtainable from ammonium ligno-sulfonate could be expected to survive.

It is an object of this invention to provide a process whereby ammonium sulfite waste liquors obtained from wood pulping operations may be disposed of in an economical manner and valuable constituents contained therein simultaneously recovered.

I have now found that ammonium sulfite waste pulping liquors can economically be treated for disposal without stream pollution by a process involving concentrating the liquors to about 50–80% by weight of solids; dispersing the concentrated liquors into a first zone wherein an oxidizing atmosphere is maintained; dehydrating said liquors and partially decomposing the solids therein by heating said liquors and solids in said first zone from the boiling point of the incoming liquors to temperatures in the range between about 600° F. and about 1400° F. over a heating time of at least about 1 second; passing resulting partially decomposed solids into a combustion zone wherein an oxidizing atmosphere is maintained and temperatures are at least about 1500° F.; and recovering gaseous products of said process.

I have discovered that in an oxidizing atmosphere ammonium sulfite waste pulping liquors, dispersed in e. g. film, droplet, or spray form, are rapidly dehydrated in contact with a surrounding atmosphere having temperatures of about 600°–1500° F., and when the resulting dehydrated solids are heated to about 600°–1400° F. a rapid decomposition results with liberation of the major portion of their nitrogen as ammonia and part of their sulfur as sulfur dioxide. When the solids are thus heated, I have found, even in an oxidizing atmosphere the evolved ammonia does not seriously interfere with recovering sulfur dioxide substantially uncontaminated by sulfate, hydrogen sulfide and/or colloidal sulfur.

The residence time in this dehydration-decomposition zone need not be long, but should be at least about one second. With the incoming liquors in dispersed form, the decomposition and liberation of ammonia from the solids in said liquors proceeds very rapidly. Except when dehydration and heating are practically instantaneous, by the time the incoming liquors have been heated to dehydrate the solids thereof and raise the temperature of said solids to 600° F., decomposition of the solids will have reached substantial proportions. Since it is desired that the major liberation of ammonia occur under relatively mild conditions, a minimum heating time of about one second in the dehydration-decomposition zone should be allowed in accordance with my process. Should the concentrated waste liquors and solids thereof be heated practically instantaneously above about 1400° F., e. g. by spraying them directly into a high temperature zone, at say 1700° F. or above, the decomposition products including ammonia would be liberated chiefly at such high temperatures that ammonia would oxidize, decompose in contact with carbon, etc. Likewise should the liquors be passed directly into a combustion zone having oxidizing atmosphere, even at lower temperatures than 1700° F., liberated ammonia would ignite.

Ammonia evolved in the dehydration-decomposition zone in accordance with my process can be recovered by withdrawing and cooling it. For maximum recovery of this ammonia, it is advantageous to avoid contact thereof with exposed surfaces catalytic of ammonia decomposition, such as exposed metallic surfaces, at temperatures above about 800° F. Water jacketed metallic walls are suitable for construction of the dehydration-decomposition zone but preferably any exposed metallic surfaces in this zone which reach temperatures above about 800° F. should be coated so that ammonia decomposition will not be catalyzed by these surfaces. Suitable coatings include silica, enamel and sodium silicate-barium sulfate, among others.

Permissible gas temperatures in the dehydration-decomposition zone can be higher than the temperatures reached say in 1 second by dehydrated solids during decomposition in said zone, since in the short time during which treatment may last, thermal equilibrium may not be established. The rate at which incoming material heats up will depend on its concentration, degree of dispersion, etc. But temperatures of exit gases leaving the dehydration-decomposition zone preferably should not exceed about 1500° F. in order that ammonia decomposition or oxidation and sulfur dioxide oxidation be not excessive. Temperatures of the solids treated in said zone preferably reach at least about 900° F. but preferably do not exceed about 1300° F., whereby ammonia is rapidly liberated from said solids under conditions favorable for its preservation.

For maximum ammonia recovery it is advantageous to rapidly withdraw and cool the exit gases including ammonia, e. g. to pass them to a cooling zone within an average time of one minute from the time the ammonia is evolved. Especially when relatively high temperatures such as 1300° F. and above are employed in the dehydration-decomposition zone in accordance with my process, cooling of evolved ammonia is preferably within an average time of not more than about 10 seconds from the time when the ammonia is evolved.

The steam evolved by operating in accordance with my process has an important effect in that it protects ammonia from decomposition, especially under conditions of relatively high temperature in my dehydration-decomposition zone.

Preferably my process is operated as a self-sustaining combustion operation. To this end, the waste pulping liquor fed into the dehydration-decomposition zone is first concentrated externally of this zone to about 50%–80% by weight of solids and is introduced hot directly from the concentrator or after being further heated, e. g. by indirect heat transfer. To make the combustion self-sustaining, temperatures in the range of about 1800°–2200° F. and higher are employed in the final combustion zone. These relatively high temperatures have the further advantage of favoring formation of sulfur dioxide as against sulfate. A refractory combustion chamber is advantageous in obtaining these desired high combustion temperatures.

The furnace employed is advantageously of the vertical type, such as used in combustion of waste kraft pulping liquors, modified to provide a dehydration-decomposition zone in accordance with my process. This dehydration-decomposition zone can be a separate zone heated directly or indirectly by hot combustion gases from the main combustion zone, and feeding dehydrated and partially decomposed solid into the main combustion zone by gravity or otherwise. Alternatively the dehydration-decomposition zone can be established in the upper part of the vertical chamber above the combustion zone by suitably spraying concentrated waste liquor into this upper zone.

For example the waste liquor can be sprayed upwardly into the upper part of the vertical chamber. The spray cools the upper zone and simultaneously, as the spray rises and then falls back again and down toward the combustion zone, the spray is subjected to dehydration and decomposition conditions for a length of time depending chiefly on the height to which the spray rises.

Suitably the spray can be introduced at a point about 5–20 feet below the roof of the furnace and sprayed up at the roof. The spray will take more than one second in rising to a height of 4 feet or more and dropping back to its initial level. Using relatively high temperatures in the dehydrating-decomposing zone in accordance with my process, such as about 900°–1500° F., a one second exposure time in this zone can suffice for the complete desired dehydration-decomposition treatment. To the extent that concentrated liquors strike and cling to the upper walls or roof of the vertical furnace chamber, they will be retained in the upper zone of the chamber longer, until sufficiently dehydrated and decomposed to break away and fall into the combustion zone.

Temperatures in the upper zone of a vertical furnace, spray cooled as above outlined, will vary depending on factors such as the temperature in the combustion zone, the volume of water sprayed into the cooled zone per minute, heat losses, etc. When temperatures in the cooled dehydration-decomposition zone are relatively low, e. g. around 600°–900° F., it is advantageous to direct the spray to strike the upper walls or roof of the furnace thereby prolonging residence of incompletely dehydrated material in the dehydration-decomposition zone.

To the same end, an inward sloping surface or baffle plate can be employed as a target for the spray, on which "stalactites" of concentrated liquor and solids can grow, these eventually breaking away and falling into the combustion zone.

Plates or walls can be located more or less completely surrounding the spray but leaving a bottom opening to allow decomposed solid to drop into the combustion zone. By this arrangement a considerable volume of the hot combustion gases from the combustion chamber will be kept out of the spray cooled zone while the steam evolved will be concentrated therein, so that cooling thereof will be correspondingly more intensive. Gases from such spray cooled zone can be withdrawn together with the combustion gases, e. g. to a waste heat boiler, or can be withdrawn separately for cooling. Separate withdrawal has the advantage of giving more concentrated ammonia gas, in which considerable sulfur dioxide gas will also be present; and minimizes risk of over-heating ammonia in an oxidizing atmosphere.

Upward spray has advantage in all of the modes of operation above discussed in that, among other things, it results in contacting the hottest ascending combustion gases with the most dilute waste liquor, favoring quick dehydration. Moreover by upward spraying the spray is concentrated in the upper zone of the furnace, wherein cooling to moderate temperatures is desired for the decomposition step.

Temperature of the spray cooled zone, as noted above, depends in part of the volume of water per minute sprayed into this zone. The cooled zone temperature can therefore be regulated by varying the height of the spray, greater heights corresponding to greater volumes of water per minute and functioning to reduce temperatures in the zone above the spraying nozzle.

Independent temperature regulation in the spray cooled zone can be accomplished by varying the concentration of the waste liquor, lower concentrations corresponding to greater volumes of water per minute and functioning to reduce temperatures in the spray cooled zone. These two methods of regulation can be interadjusted to maintain desired spray zone temperatures and at the same time maintain desired rate of feed of dehydrated, decomposed solid to the combustion zone. Preferably at least part of the spray is thrown upward to a height of at least about 4 feet above the spray nozzle before falling back or striking and clinging to a surface, and preferably liquor is concentrated to about 50-65% by weight solids content before spraying.

In accordance with this invention, pulp produced in an ammonium sulfite pulping process is washed on a series of two or more washers, the washings from washers other than the first washer being employed as the washing medium on a preceding washer. The washings from the first washer, comprising an aqueous ammonium ligno-sulfonate solution, are then concentrated to form a liquor containing between about 50% and about 80% solids, the vapors distilled off, which contain ammonia, are condensed and a portion of the condensate is employed as the washing medium in the last of the series of washers referred to above. The concentrated liquor is then burned in a combustion furnace in accordance with the procedure above outlined, whereby ammonia and sulfur dioxide are evolved and a large amount of useful heat is generated which may be employed in waste heat boilers and the like. The ammonia and sulfur dioxide can be recovered by absorption thereof in water and the resulting ammonium sulfite solution then re-employed for pulping further quantities of wood.

Combustion of the concentrated liquor in accordance with this invention can be made self-supporting by suitable concentration of liquors and suitably rapid supply of fuel and air and use of heat-retaining construction in the combustion zone; furthermore, substantially no ash remains in the furnace. Accordingly, my invention satisfactorily solves the problem of disposing of the ammonium sulfite waste liquor, and, in addition, permits ammonia and sulfur dioxide contained in such liquor to be recovered in an economical manner; further the process of my invention provides a highly integrated procedure for recovering the values in such waste liquors involving use of minimum amounts of water and in preferred forms accomplishes maximum recovery of ammonia and sulfur dioxide.

The process of my invention can be carried out on any ammonium sulfite waste liquor produced as a result of pulping wood or other cellulosic material such as straw, esparto, etc. with an aqueous ammonium sulfite solution; thus the ammonium sulfite solution employed in the pulping operation can be either acid, neutral or alkaline. Pulping of wood with ammonium sulfite is preferably carried out employing an acid ammonium sulfite solution containing free sulfur dioxide, so that the process of my invention will be specifically described in terms of treatment of a waste liquor resulting from such an operation, although it should be understood other ammonium sulfite waste liquors can be treated in a similar manner.

The accompanying drawing diagrammatically illustrates a preferred embodiment of my invention. As shown in this drawing, wood chips prepared from coniferous or deciduous pulpwood by conventional methods are charged to digester 1; cooking liquor containing ammonium bisulfite and free sulfurous acid is then pumped to digester 1 from storage tank 38 and the digester is closed and steamed for the desired cooking cycle, liquor being circulated from the digester through heat exchanger 2. Cooking temperatures of the order of 125° to 150° C. and pressures of 60 to 90 pounds per square inch gauge have been found to be suitable. Liquor and gas passing from digester 1 during the relief periods of the digestion are separated in separator 3 and relief sulfur dioxide and other gases are passed from separator 3 through cooler 39 to relief recovery tank 37 for treatment as hereinafter described; liquor from separator 3 is passed to storage box 8 hereinafter described. On completion of the cook, the pulp is blown to blow pit 4 which, as shown in the drawing, is provided with blow steam condenser 5.

In blow pit 4 the pulp is diluted with washings from washer 7 and the slurry is then pumped to head box and consistency regulator 6, which feeds to rotary washer 7; in washer 7 the pulp is washed with washings from washer 9 hereinafter described to remove waste liquor therefrom, the washings from washer 7 being passed to storage box 8 wherein they are admixed with the liquor from separator 3. A portion of the washings in box 8 is passed to blow pit 4 as described; another portion may be utilized in washer 7, if desired; the remainder is pumped to feed tank 20 for treatment hereinafter described. The pulp from washer 7 is diluted to the desired consistency by the washings from washer 9 and passed to said washer, whereon it is washed with liquor from sump tank 12, obtained as described hereinafter. The completely washed pulp from washer 9 is sent to the screen room for further treatment. Washings from washer 9 are passed to storage box 10; a portion of these washings is used to dilute pulp from washer 7, another portion is used as wash liquid in washer 7, still another portion may be fed to head box 6 and the remainder is employed as hereinafter set forth.

The washings from washer 7 which have been pumped through box 8 to tank 20 as above described comprises the bulk of the waste ammonium sulfite liquor. This liquor is fed from tank 20 to cascade disc evaporators 18 wherein it is concentrated to a total solid content between 12% and 20% by weight; evaporators 18 utilize the heat in the combustion gases from waste heat boiler 17, the operation of which is described hereinafter. During the evaporation free and loosely combined sulfur dioxide is liberated from the liquor, thereby reducing its corrosiveness.

The concentrated liquor from disc evaporators 18 is passed to sump tank 19 and thence to storage tank 11 which feeds quintuple effect evaporators 14, suitably of the falling film type. Steam is fed to the first effect of the evaporators, which is shown as a double body effect, and the liquor to be concentrated is fed to the last effect. In the multiple effect evaporators, the liquor is further concentrated to a solid content of 50% to 65% by weight; and can be concentrated to as much as 80% solids, e. g. in forced circulation concentrators using high pressure steam.

As shown in the drawing the condensate from the first effect of the evaporators is passed to a boiler, and the condensates from the last four effects are sent to sump tank 12. The aqueous condensate from barometric condenser 13 on the last heating effect contains residual ammonia liberated from the incoming waste liquor and is also fed to sump tank 12. Liquor is withdrawn from sump tank 12 for use in washing pulp in washer 9 as hereinabove described; liquor from tank 12 may also be fed to the water line to barometric condenser 13 as shown.

Concentrated liquor from the multiple effect evaporators is passed to tank 15; from tank 15 the concentrated waste liquor is sprayed into combustion furnace 16, the spray nozzles being located, as shown, in the side wall of the furnace and the spray being directed so that the liquor is blown directly across the combustion zone, preferably arching upward to a height at least about four feet above the nozzle. In the spray-cooled zone the liquor is dehydrated and resulting dehydrated solid is decomposed to liberate at least the major proportion of its nitrogen content. The decomposed solid falls into the combustion chamber and is then burned completely to carbon dioxide, water, and sulfur dioxide, only a negligible amount of ash being formed; this ash is discarded. To assist the combustion air can be admitted to the primary and secondary tuyères shown in the drawing. An excess of air over that required for complete combustion of the carbon, hydrogen, and sulfur remaining in the solid is maintained throughout the combustion zone and an oxidizing atmosphere is maintained in the dehydration-decomposition zone.

The hot combustion gases rise from furnace 16 to waste heat boiler 17 of conventional vertical tube design, wherein high pressure steam is generated for use as desired. The gases from boiler 17 then pass through cascade disc evaporators 18, wherein they are utilized to evaporate waste liquor as above described.

From disc evaporators 18 the gases are drawn through fan 21 to absorption towers 22 and 23; in these towers ammonia and sulfur dioxide are absorbed by passing the gases countercurrent to a flow of weak ammonium sulfite liquor from tank 10, which liquor, as above noted, is made up of washings from second washer 9. Scrubbed gases are vented to the air through a stack on the second absorption tower 23.

The ammonium sulfite liquor from absorption tower 22 is pumped through filter 24 and is then cooled in heat exchanger 25 and passed to tower 27. Sulfur dioxide (formed by melting sulfur in tank 30, feeding the molten sulfur to chamber 31, wherein it is volatilized and partially burned and then completing burning of the sulfur vapor in combustion chamber 29) is cooled in a film type cooler 28 and introduced into tower 26; the sulfur dioxide flows through towers 26 and 27 countercurrent to the ammonium sulfite liquor admitted to tower 27, whereby an ammonium bisulfite liquor containing free sulfur dioxide is formed, inert gas being discharged from tower 27. Liquid ammonia in tank 32 is withdrawn to vaporizer 33, and the ammonium vapor then passed through rotameter 34 and barometric loop 35 into the line from tower 26 through which the ammonium bisulfite-sulfurous acid liquor is withdrawn, the ammonia thereby dissolving in the liquor. The thus fortified liquor is passed to tower 36, wherein it is contacted with unabsorbed sulfur dioxide from recovery tank 37, any sulfur dioxide remaining unabsorbed in tower 36 being admixed with the sulfur dioxide produced in burner 31 as shown. Liquor from tower 36 is employed in tank 37 to absorb relief sulfur dioxide from digester 1 and the strong liquor thus formed is then passed to storage tank 38, from which it is charged to digester 1.

Since certain changes may be made in carrying out the above process without departing from the scope of the invention, it is intended that all matter contained in the above description shall be interpreted as illustrative and not in a limiting sense. For example, the concentrated liquor from the multiple effect evaporators may be disposed of by feeding it to an oil burner or to the fuel bed of a coal furnace, wherein it is burned; such modifications, however, are not preferred as the ammonia and sulfur dioxide may not be readily recovered when operating in this manner. Extraneous fuel such as oil can also be fed with the liquor, for example in order to raise the combustion zone temperature to desired levels when it is too low.

I claim:

1. Process for treatment of waste liquors from pulping wood with aqueous ammonium sulfite pulping liquors, for the purpose of recovering ammonia and sulfur dioxide, which comprises concentrating said waste liquors until they contain between about 50 and about 80% by weight of solids; dispersing said concentrated liquors in a first zone wherein an oxidizing atmosphere is maintained said oxidizing atmosphere being provided by combustion gases admixed with air from the combustion zone below specified; dehydrating said liquors and partially decomposing the solids therein by heating said liquors and solids in said first zone from the boiling point of incoming waste liquors to temperatures in the range between about 600° F. and about 1400° F. over a heating time of at least about 1 second; withdrawing steam and ammonia generated in said first zone and cooling said steam and ammonia for the recovery of said ammonia; passing resulting dehydrated, partially decomposed solids to a combustion zone wherein there is maintained throughout an excess of air over that required for complete combustion of the carbon, hydrogen and sulfur content of said solids to carbon dioxide, water and sulfur dioxide and wherein temperatures are at least about 1500° F.; and passing the combustion gases admixed with air to the aforesaid dehydrating and decomposing zone and thereafter absorbing the effluent gases in aqueous ammonium sulfite solution for recovery of the sulfur dioxide and ammonia content of these effluent gases.

2. Process as defined in claim 1, wherein temperatures of exit gases from the dehydration-decomposition zone are not above about 1500° F. and temperatures in the combustion zone are in the range 1800–2200° F.

3. Process as defined in claim 2, wherein waste liquors concentrated to about 50–65% by weight of solids are dispersed hot by spraying into a dehydration-decomposition zone having maximum temperatures in the range between about 900° F. and about 1500° F., devoid of exposed metallic surfaces; temperatures reached by partially decomposed solids in said zone are in the range between about 900° F. and about 1300° F.; and evolved ammonia gas is withdrawn and is cooled within an average time of not more than 10 seconds from the time it is evolved.

4. Process as defined in claim 1, wherein waste ammonium sulfite pulping liquors of 50–80% solids content are sprayed upward, to a height at least 4 feet above their point of introduction, into the upper zone of a vertical chamber above a combustion zone with temperature in the combustion zone of about 1800°–2200° F., with exit gas temperatures from said sprayed upper zone not exceeding about 1500° F., and with feed rates and concentrations of waste liquors interadjusted to maintain a self-supporting combustion.

5. Process for treatment of waste liquors from pulping wood with aqueous ammonium sulfite pulping liquors, for the purpose of recovering ammonia and sulfur dioxide, which comprises concentrating said waste liquors until they contain between about 50 and about 80% by weight of solids; dispersing said concentrated liquors in a first zone wherein an oxidizing atmosphere is maintained, said oxidizing atmosphere being provided by combustion gases admixed with air from the combustion zone below specified; dehydrating said liquors and partially decomposing the solids therein by heating said liquors and solids in said first zone from the boiling point of incoming waste liquors to temperatures in the range between about 600° F. and about 1400° F. over a heating time of at least about 1 second; withdrawing steam and ammonia generated in said first zone and cooling said steam and ammonia for recovery of said ammonia; passing resulting dehydrated, partially decomposed solids to a combustion zone wherein there is maintained throughout an excess of air over that required for complete combustion of the carbon, hydrogen and sulfur content of said solids to carbon dioxide, water and sulfur dioxide and wherein temperatures are at least about 1500° F.; and passing the combustion gases admixed with air to the aforesaid dehydrating and decomposing zone and thereafter absorbing the effluent gases in aqueous ammonium sulfite solution for recovery of the sulfur dioxide and ammonia content of these effluent gases; in which process the pulp is washed in a series of washers in which at least a part of the washings from each washer with the exception of the first washer is used as the washing medium in the preceding washer; the washings from the first washer which comprise the bulk of the ammonium sulfite waste liquor are concentrated to a total solid content of between about 12% and 20% by weight by contact with the hot combustion gases leaving the dehydrating and decomposing zone as above described, thereby removing free and loosely combined sulfur dioxide from the liquor; said liquor is further concentrated to a total solid content of between about 50% and 80% by weight; a portion of the ammonia-containing condensate obtained during said second concentration operation is utilized as the washing medium on the last of the series of washers above specified; and the effluent combustion gases from the above described first concentration operation are absorbed in aqueous ammonium sulfite solution which includes a portion of the washings from the last of the above specified series of washers.

References Cited in the file of this patent

UNITED STATES PATENTS

| | | |
|---|---|---|
| 291,264 | Addie | Jan. 1, 1884 |
| 672,059 | Von Giese | Apr. 16, 1901 |
| 1,137,780 | Moore | May 4, 1915 |
| 1,327,666 | Fagan et al. | Jan. 13, 1920 |
| 2,032,437 | Richter | Mar. 3, 1936 |
| 2,142,988 | Bacon | Jan. 10, 1939 |
| 2,179,456 | Tomlinson | Nov. 7, 1939 |
| 2,354,175 | Wilcoxson | July 18, 1944 |
| 2,385,955 | Tomlinson | Oct. 2, 1945 |
| 2,582,792 | Paren | Jan. 15, 1952 |

FOREIGN PATENTS

| | | |
|---|---|---|
| 6,563 | Great Britain | of 1900 |
| 15,752 | Great Britain | of 1903 |